(12) United States Patent
Guo et al.

(10) Patent No.: US 12,184,031 B2
(45) Date of Patent: Dec. 31, 2024

(54) OPTICALLY PUMPED ON-CHIP SOLID-STATE LASER

(71) Applicant: Huazhong University of Science and Technology, Wuhan (CN)

(72) Inventors: Weihua Guo, Wuhan (CN); Juan Xia, Wuhan (CN); Qiaoyin Lu, Wuhan (CN)

(73) Assignee: HOAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 453 days.

(21) Appl. No.: 17/562,942

(22) Filed: Dec. 27, 2021

(65) Prior Publication Data

US 2023/0124384 A1   Apr. 20, 2023

(30) Foreign Application Priority Data

Oct. 20, 2021   (CN) .......................... 202111219674.7

(51) Int. Cl.
| | |
|---|---|
| H01S 3/063 | (2006.01) |
| H01S 3/06 | (2006.01) |
| H01S 3/08 | (2023.01) |
| H01S 3/094 | (2006.01) |
| H01S 3/106 | (2006.01) |
| H01S 3/16 | (2006.01) |

(52) U.S. Cl.
CPC ........ *H01S 3/0627* (2013.01); *H01S 3/08009* (2013.01); *H01S 3/094049* (2013.01); *H01S 3/1066* (2013.01); *H01S 3/1611* (2013.01); *H01S 3/1625* (2013.01); *H01S 3/1636* (2013.01); *H01S 3/1643* (2013.01)

(58) Field of Classification Search
CPC .... H01S 3/0627; H01S 3/1066; H01S 3/0635; H01S 3/083; H01S 3/0604; H01S 3/063–0637; H01S 5/1071; H01S 5/1075
See application file for complete search history.

(56) References Cited

U.S. PATENT DOCUMENTS 4,852,117 A * 7/1989 Po ........................... H01S 3/063 372/6
2022/0337021 A1* 10/2022 Bradley ................ H01S 3/1616

FOREIGN PATENT DOCUMENTS

CN          108879299       * 11/2018   ........... H01S 3/1615

* cited by examiner

*Primary Examiner* — Tod T Van Roy
*Assistant Examiner* — Delma R Forde
(74) *Attorney, Agent, or Firm* — MATTHIAS SCHOLL P.C.; Matthias Scholl

(57) ABSTRACT

An optically pumped on-chip solid-state laser includes a solid gain media substrate and a laser generating structure disposed above the solid gain media substrate. The laser generating structure includes a resonator, a pump light input structure, and a laser light output structure; and the resonator is disposed between the pump light input structure and the laser light output structure, and is propped against or is in clearance fit with the solid gain media substrate.

22 Claims, 5 Drawing Sheets

OPTICALLY PUMPED ON-CHIP SOLID-STATE LASER

CROSS-REFERENCE TO RELAYED APPLICATIONS

Pursuant to 35 U.S.C. § 119 and the Paris Convention Treaty, this application claims foreign priority to Chinese Patent Application No. 202111219674.7 filed Oct. 20, 2021, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of solid-state lasers, and more particularly to an optically pumped on-chip solid-state laser.

Monolithic solid-state lasers are smaller and more integrated than discrete component-based solid-state lasers, with higher optical energy density and therefore lower lasing threshold, and smaller resonator size and therefore higher wavelength stability. One type of monolithic solid-state lasers is made of a monolithic laser crystal in free space. A typical example is the monolithic Nd-doped yttrium aluminum garnet (YAG) solid-state laser based on a non-planar ring oscillator (NPRO) proposed by Stanford University in 1984. With a resonator thereof being provided in a monolithic Nd-doped YAG crystal, the laser is packaged in a volume of only 38 mm×13 mm×3 mm, and allows a single-mode output with a good frequency stability. Another type of monolithic solid-state lasers is on-chip solid-state lasers that have a smaller mode size and a lower lasing threshold than that of free-space solid-state lasers, and are easily packaged for compatibility and integration with silicon-based photonics platforms. The current mainstream fabrication method of on-chip solid-state lasers is to fabricate on-chip lasers by preparing optical waveguides, resonators, and other optical field confinement structures in a laser crystal by femtosecond laser direct writing, ion implantation, and ion exchange techniques. However, in these techniques, a waveguide structure is mainly formed by injecting energy of laser beams or ion beams into a gain material to induce the refractive index change of the crystal, so the refractive index difference between the waveguide and the surrounding media is small and the mode size is still large (tens to hundreds of microns), leading to the following shortcomings. On the one hand, the lasing threshold is still limited by the mode size although it is much lower than that of free-space lasers. On the other hand, the bending radius of the waveguide is very large, which leads to a larger size of the resonator, beam splitter and other devices formed by the waveguide, affecting the integration.

SUMMARY

One objective of the disclosure is to provide an optically pumped on-chip solid-state laser to solve the problems existing in the prior art, and overcome the problems of existing monolithic solid-state lasers, such as relatively large mode size, high lasing threshold and low integration.

Thus, the disclosure provides an optically pumped on-chip solid-state laser comprising a solid gain media substrate, and a laser generating structure disposed above the solid gain media substrate; the laser generating structure comprises a resonator, a pump light input structure, and a laser light output structure; and the resonator is disposed between the pump light input structure and the laser light output structure, and is propped against or is in clearance fit with the solid gain media substrate.

In a class of this embodiment, the resonator is a dielectric resonator comprising a dielectric material different from a material of the solid gain media substrate, and the dielectric material has a refractive index higher than that of the solid gain media substrate; the resonator has a mode field that overlaps with the solid gain media substrate; pump light is input by the pump light input structure into the resonator from outside, and the pump light in the resonator has an optical field distribution that overlaps with the solid gain media substrate to form an overlap region, so that the solid gain media substrate is excited in the overlap region to form a population inversion region; and a lasing mode in the resonator has an optical field distribution that overlaps with the population inversion region in the solid gain media substrate, resulting in gain, and when the gain is greater than loss, laser light is generated and output by the laser light output structure.

In a class of this embodiment, the resonator is a traveling-wave ring resonator or a whispering gallery resonator.

In a class of this embodiment, the laser light generated in the resonator is coupled from the resonator to a waveguide through a coupler by evanescent-field coupling.

In a class of this embodiment, the pump light is coupled from a waveguide into the resonator through a coupler by evanescent-field coupling.

In a class of this embodiment, the laser light generated in the resonator is coupled from the resonator to a waveguide through a coupler by evanescent-field coupling, and the pump light is coupled from a waveguide into the resonator through the same coupler.

In a class of this embodiment, the traveling-wave ring resonator is a cross type traveling-wave ring resonator provided with a cross coupler comprising waveguides.

In a class of this embodiment, the laser light generated in the resonator is output from one of the waveguides of the cross coupler.

In a class of this embodiment, the pump light is input into the resonator from one of the waveguides of the cross coupler.

In a class of this embodiment, the pump light is input into the resonator from one of the waveguides of the cross coupler, and the laser light generated in the resonator is output from the same waveguide.

In a class of this embodiment, the solid gain media substrate comprises a material with a magneto-optical effect, and the magneto-optical effect is generated by an applied magnetic field, so that frequency degeneracy between clockwise and counterclockwise modes of the resonator is lifted, and the laser light is generated only in a single direction, which is clockwise or counterclockwise.

In a class of this embodiment, a material with a magneto-optical effect is provided near the resonator, and the magneto-optical effect is generated by an applied magnetic field, so that frequency degeneracy between clockwise and counterclockwise modes of the resonator is lifted, and the laser light is generated only in a single direction, which is clockwise or counterclockwise.

In a class of this embodiment, a permanent magnet, by which the magnetic field is generated, is disposed above the resonator.

In a class of this embodiment, the mode of the traveling-wave ring resonator is a quasi-transverse magnetic mode, and the permanent magnet, with a diameter difference of 0 to 10% from the traveling-wave ring resonator, is a cylindrical permanent magnet axially magnetized, and disposed above and coaxial with the traveling-wave ring resonator; and the permanent magnet generates a static magnetic field whose principal component at the mode field of the traveling-wave ring resonator is a radial component.

In a class of this embodiment, the laser light is generated only in a single direction in the resonator, which is clockwise or counterclockwise, thus eliminating spatial hole-burning, and the laser light is in a single longitudinal mode.

In a class of this embodiment, the laser light generated in the resonator is coupled from the resonator to a waveguide through a coupler by evanescent-field coupling and output in a single direction.

In a class of this embodiment, the pump light input structure and the laser light output structure comprise on-chip planar optical waveguides or optical fibers.

In a class of this embodiment, the resonator is an F—P type standing-wave resonator.

In a class of this embodiment, reflectors of the F—P type standing-wave resonator are formed by coating end faces of the waveguide or by Bragg gratings.

In a class of this embodiment, the pump light is input through one of the reflectors.

In a class of this embodiment, the laser light is output through one of the reflectors.

In a class of this embodiment, the resonator is covered by an upper cover layer with a refractive index lower than that of the dielectric material of the resonator.

In a class of this embodiment, the solid gain media substrate is a solid laser crystal wafer doped with luminescent ions, and the solid laser crystal wafer is yttrium aluminum garnet (YAG) wafer, sapphire wafer, or lithium niobate wafer.

According to the optically pumped on-chip solid-state laser provided by the disclosure, the resonator, the waveguides and other on-chip optical field confinement structures are made of materials with high refractive index which is significantly different from that of surrounding media, so that the optical field confinement capability is greatly enhanced, the mode size and the bending radius of the waveguides are greatly reduced, and the resonator size is greatly reduced. The dramatic reduction in the mode size and the resonator size brings a significant reduction in the lasing threshold, and a significant increase in device integration and stability, among other benefits. In addition, optical structures such as resonators and waveguides in the disclosure may be prepared by, but not limited to UV lithography, electron beam lithography, focused ion beam etching and other mature micro-nano preparation technologies which are flexible and diverse, and highly adaptable.

BRIEF DESCRIPTION OF THE DRAWINGS

FIG. 2A is the optical field distribution of pump light at 808 nm and FIG. 2B is the optical field distribution of lasing mode at 1064 nm;

DETAILED DESCRIPTION

To further illustrate, embodiments detailing an optically pumped on-chip solid-state laser are described below. It should be noted that the following embodiments are intended to describe and not to limit the disclosure.

Figure 1:
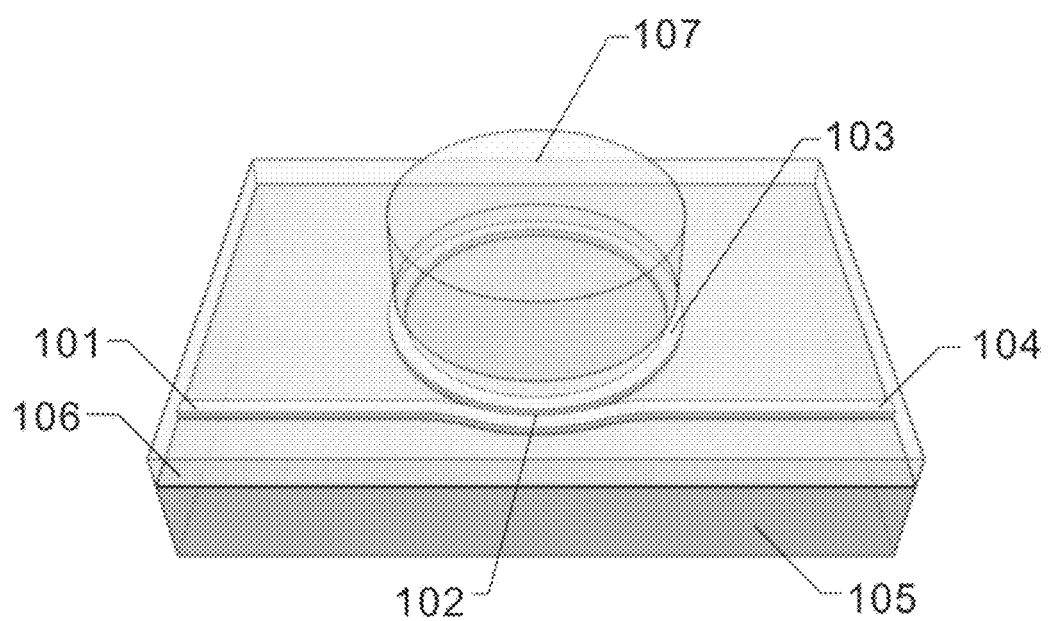
FIG. 1 is a schematic diagram of an example of a first embodiment of the disclosure (i.e., the resonator is a traveling-wave ring resonator)

FIG. 1 shows an example of a first embodiment of the disclosure (i.e., the resonator is a traveling-wave ring resonator), which mainly comprises an input waveguide 101, a coupler 102, a ring resonator 103, an output waveguide 104, a solid gain media substrate 105, an upper cover layer 106, and a permanent magnet 107. Pump light is input into the input waveguide 101 by tapered fiber end face coupling, lens end face coupling, tapered fiber evanescent-field coupling or grating coupling, and then coupled by the coupler 102. The coupler is a directional coupler based on evanescent field coupling, and is designed based on the following principles. The pump light coupled by the coupler 102 is input into the ring resonator 103, and laser light generated in the ring resonator 103 is coupled by the coupler 102 and mostly returned to the ring resonator 103, with only few being coupled and output as laser output. The permanent magnet 107, with a diameter difference of 0 to 10% from the ring resonator 103, is a cylinder and axially magnetized, provided on the upper cover layer 106, and coaxial with the ring resonator 103.

Figure 2A:
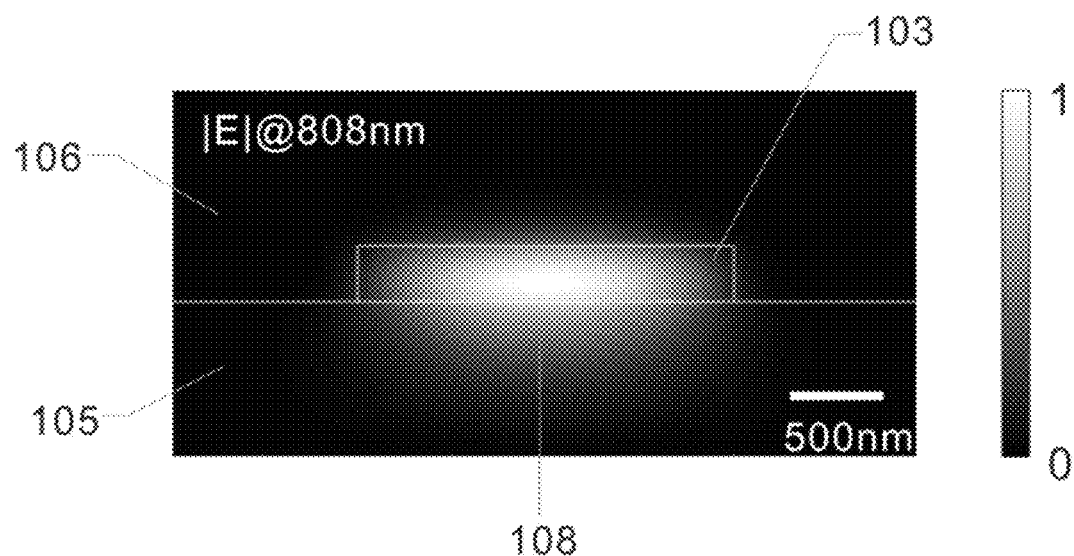
FIG. 2A-2B show optical mode field distributions of the waveguide section of a ring resonator in a specific case A in the embodiment of FIG. 1, where
Figure 2B:
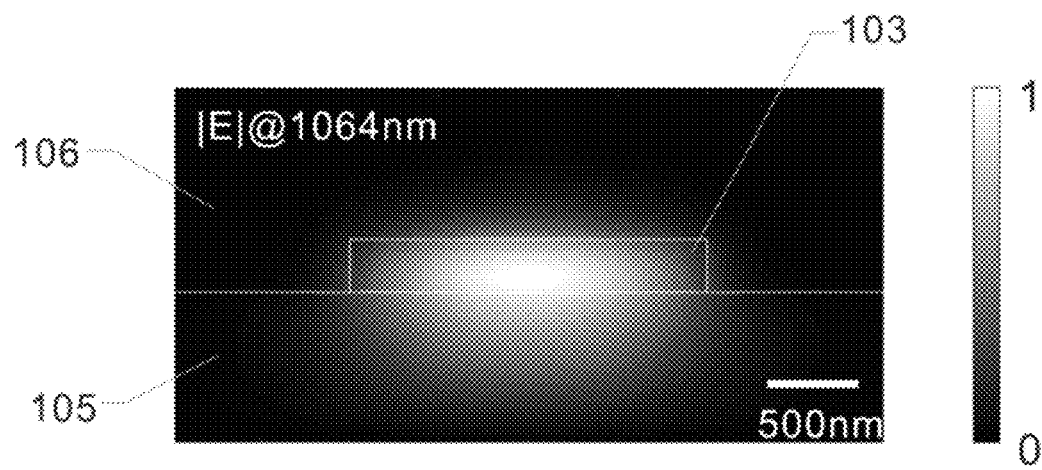
Figure 3:
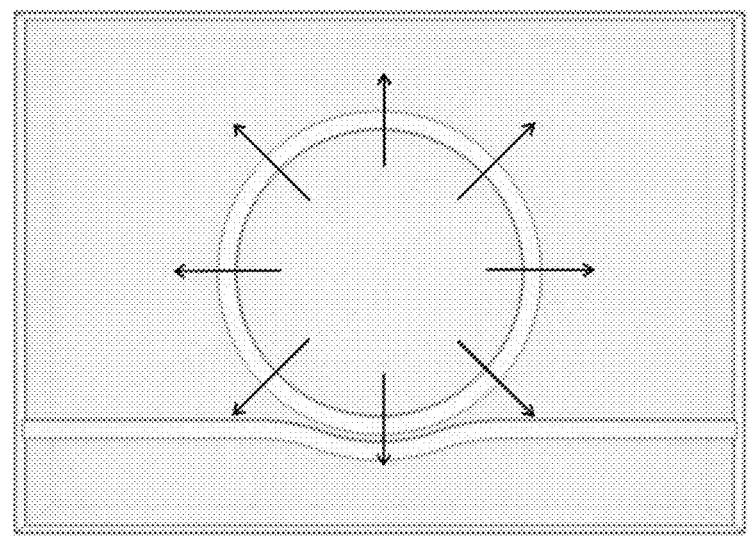
FIG. 3 is a schematic diagram of directions of the magnetic field at the resonator applied by a permanent magnet in the embodiment of FIG. 1.

In a specific case A of the embodiment of FIG. 1, the solid gain media substrate 105 is a Nd-doped YAG wafer, the input waveguide 101, the coupler 102, the ring resonator 103, and the output waveguide 104 are all prepared from silicon nitride thin film grown on the YAG wafer, the upper cover layer 106 is a silicon dioxide layer, and the cylindrical permanent magnet 107 is provided on the surface of the upper cover layer 106 at a position aligned with the ring resonator 103. Cross sections of the silicon nitride waveguide constituting the ring resonator 103 are shown as 103 in FIGS. 2A-2B, and mode field distributions at the absorption peak 808 nm and the maximum gain peak 1064 nm of neodymium ions are as shown in FIGS. 2A and 2B, respectively. The mode field distributions show that the optical field distribution of the pump light at 808 nm in the ring resonator 103 overlaps with the Nd-doped YAG substrate, so that the neodymium ions in the YAG are excited in the overlap region to form a population inversion region 108. The optical field distribution of lasing mode at 1064 nm in the ring resonator 103 also overlaps with the population inversion region 108 in the Nd-doped YAG substrate, resulting in gain. When the gain is greater than loss, laser light is generated and output. The mode of the ring resonator 103 is a quasi-transverse magnetic mode, and the permanent magnet 107, with a diameter difference of 0 to 10% from the ring resonator 103, is a cylindrical permanent magnet axially magnetized, provided above and coaxial with the traveling-wave ring resonator 103, so that the principal component of the static magnetic field at the mode field of the traveling-wave ring resonator is a radial component, as shown by arrows in FIG. 3 (outward or inward, only outward arrows shown). Under the magnetic field generated by the permanent magnet 107, the magneto-optical effect in the Nd-doped YAG substrate lifts the frequency degeneracy between clockwise and counterclockwise modes of the ring resonator 103, and the laser light is generated only in a single direction, which is clockwise or counterclockwise. Therefore, spatial hole-burning is eliminated, and the laser light is in a single longitudinal mode. By controlling the orientation of the permanent magnet 107, the laser light is only generated in counterclockwise mode in the ring resonator 103, and laser light is coupled to the output waveguide 104 by the coupler 102, and then may be either used directly on the chip or output for off-chip applications by tapered fiber/lens end face coupling, tapered fiber evanescent-field coupling or grating coupling, or may be connected to an optical fiber amplifier or directly integrated with an on-chip optical waveguide amplifier for further optical amplification. By controlling the orientation of the permanent magnet 107, the laser light is only generated in clockwise mode in the resonator 103, and the input waveguide 101 may also serve as a laser output waveguide.

In another specific case B of the embodiment of FIG. 1, the difference with the case A is that the solid gain media substrate 105 is a Ti-doped sapphire wafer, the input waveguide 101, the coupler 102, the ring resonator 103 and the output waveguide 104 are all prepared from aluminum nitride or silicon nitride thin film grown on the Ti-doped sapphire wafer, and the upper cover layer 106 comprises a material with a magneto-optical effect.

A general preparation method according to the embodiment shown in FIG. 1 is as follows. A laser crystal wafer is taken as the solid gain media substrate 105. A layer of dielectric material with a refractive index higher than that of the substrate is grown on the substrate and the input waveguide 101, coupler 102, ring resonator 103 and output waveguide 104 are made by etching the high refractive index dielectric layer. An upper cover layer 106 made of a dielectric material with a lower refractive index is grown on the above devices, and a permanent magnet 107 is provided coaxially on the surface of the upper cover layer 106 at a position aligned with the ring resonator 103. The permanent magnet 107, with a diameter difference of 0 to 10% from the ring resonator 103, is a cylinder and axially magnetized. An alternative method is as follows. An input waveguide 101, a coupler 102, a ring resonator 103 and an output waveguide 104 are made of a dielectric material with a higher refractive index on a dielectric layer with a lower refractive index and attached to the solid gain media substrate 105. A permanent magnet 107 is provided coaxially on the surface of the dielectric layer 106 at a position aligned with the ring resonator 103. The permanent magnet 107, with a diameter difference of 0 to 10% from the ring resonator 103, is a cylinder and axially magnetized. In the case A, a specific preparation method is as follows. A Nd-doped YAG wafer is taken as the solid gain media substrate 105, on which a layer of silicon nitride thin film is grown via low pressure chemical vapor deposition (LPCVD) or inductively coupled plasma chemical vapor deposition (ICPCVD) and etched via ultraviolet lithography and inductively coupled plasma (ICP) dry etching technology to form the input waveguide 101, coupler 102, ring resonator 103 and output waveguide 104. An upper cover layer 106 made of silicon dioxide is grown via plasma enhanced chemical vapor deposition (PECVD), and a cylindrical permanent magnet 107 is provided coaxially on the surface of the upper cover layer 106 at a position aligned with the ring resonator 103. In the case B, a specific preparation method is as follows. A Ti-doped sapphire wafer is taken as a solid gain media substrate 105, on which a layer of aluminum nitride or silicon nitride thin film is grown via magnetron sputtering and etched via ultraviolet lithography and ICP dry etching technology to form the input waveguide 101, coupler 102, ring resonator 103 and output waveguide 104. A layer of material with a magneto-optical effect is formed as an upper cover layer 106 via sputtering, and a cylindrical permanent magnet 107 is provided coaxially on the surface of the upper cover layer 106 at a position aligned with the ring resonator 103.

Figure 4:
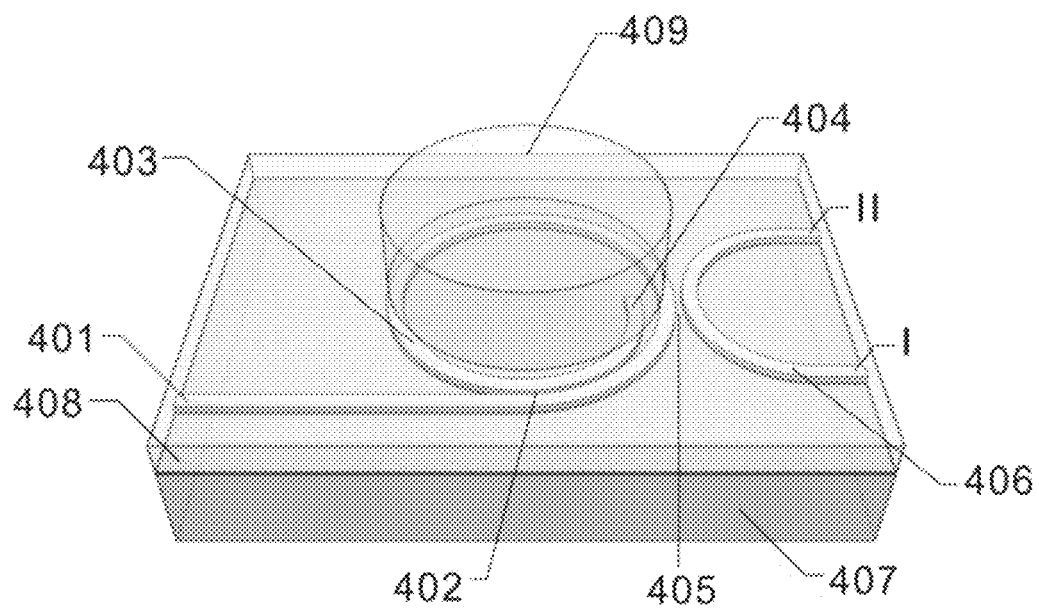
FIG. 4 is a schematic diagram of an example of a preferred scheme of the first embodiment of the disclosure (i.e., the resonator is a cross type traveling-wave ring resonator)
Figure 5A:
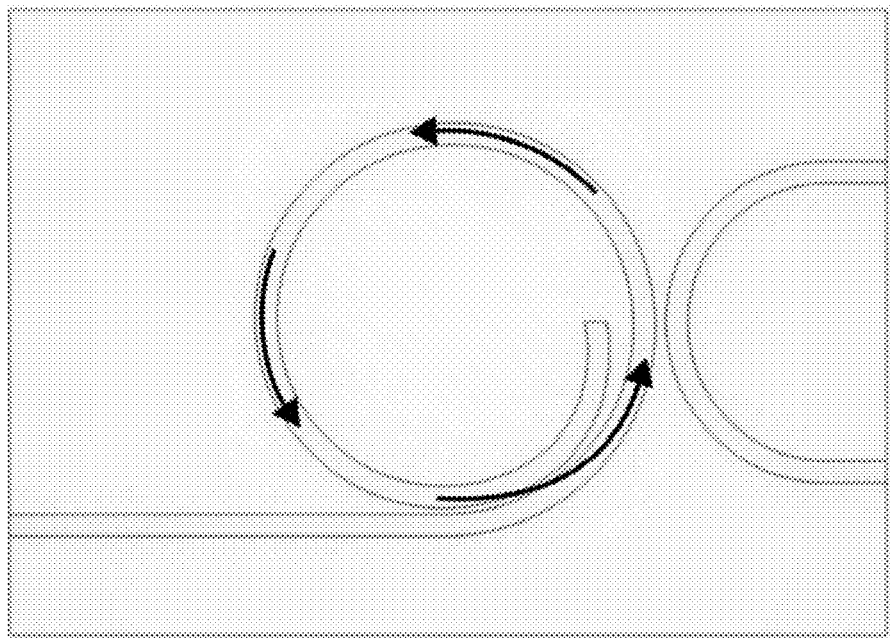
FIGS. 5A and 5B are schematic diagrams of paths of the laser light and the pump light in the embodiment of FIG. 4, respectively.
Figure 5B:
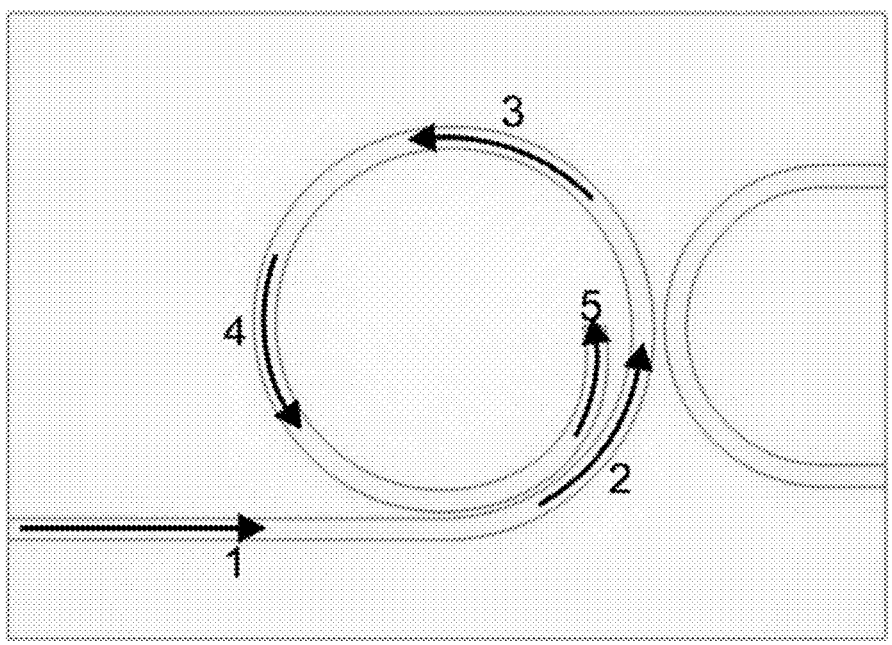

FIG. 4 shows an example of a preferred scheme of the first embodiment of the disclosure (i.e., the resonator is a cross type traveling-wave ring resonator), which mainly comprises an input waveguide 401, a cross coupler 402, a cross type ring resonator 403, an anti-reflection structure 404, an output coupler 405, an output waveguide 406, a solid gain media substrate 407, an upper cover layer 408, and a permanent magnet 409. The permanent magnet 409, with a diameter difference of 0 to 10% from the cross type ring resonator 403, is a cylinder and axially magnetized, provided on the upper cover layer 408, and coaxial with the cross type ring resonator 403. A core feature of this embodiment is that the laser resonator is a cross type ring resonator. Unlike direct type ring resonators (such as circular or racetrack-shaped ring resonators), the cross type ring resonator comprises a cross coupler 402. The cross coupler is a directional coupler based on evanescent field coupling, with different coupling coefficients for different wavelengths of light: the laser light has a long wavelength and a large coupling coefficient, so when being coupled by the cross coupler, most of laser light will be cross-coupled from one of the waveguides of the cross coupler to another. The pump light has a shorter wavelength and a smaller coupling coefficient, so when being coupled by the cross coupler, only a minor part of pump light will be cross-coupled to another waveguide, while most will still be transmitted along the original waveguide. Therefore, in the cross type ring resonator 403, the laser light will form a counterclockwise resonant loop along the path indicated by the arrows in FIG. 5A or a clockwise resonant loop along the reverse path of the path indicated by the arrows. Instead of forming a resonant loop, the pump light will be input into the resonator from the input waveguide 401 along the path indicated by the arrows 1, 2, 3, 4, and 5 in FIG. 5B. That is, after circling the resonator once, the remaining pump light is output from the resonator to the anti-reflection structure 404.

A specific operating process of the embodiment shown in FIG. 4 is as follows. The pump light is input into the input waveguide 401 by tapered fiber/lens end face coupling, tapered fiber evanescent-field coupling or grating coupling, and then into the cross type resonator 403 from the input waveguide 401 along the path indicated by the arrows 1, 2, 3, 4, and 5 in FIG. 5B. That is, after circling the resonator once, the remaining pump light is output from the resonator to the anti-reflection structure 404. Since the optical field distribution of pump light overlaps with the solid gain media substrate, the population inversion occurs in the overlap region. The optical field distribution of lasing mode also overlaps with the population inversion region in the solid gain media substrate, resulting in gain. In the cross type resonator 403, the lasing mode will form a counterclockwise resonant loop along the path indicated by the arrows in FIG. 5A or a clockwise resonant loop along the reverse path of the path indicated by the arrows, and laser light is generated when the gain is greater than loss. The mode of the cross type ring resonator 403 is a quasi-transverse magnetic mode, and the permanent magnet 409, with a diameter difference of 0 to 10% from the cross type ring resonator 403, is a cylindrical permanent magnet axially magnetized, provided above and coaxial with the ring resonator 103, so that the principal component of the static magnetic field at the mode field of the traveling-wave ring resonator is a radial component. Under the magnetic field generated by the permanent magnet 409, a magneto-optical effect is produced in the solid gain media substrate 407 and/or the upper cover layer 408: when the solid gain media substrate 407 itself is made of a magneto-optical material (such as Nd-doped YAG), magneto-optical effect is produced in the substrate; when the upper cover layer 408 is made of a magneto-optical material, magneto-optical effect is produced in the upper cover layer. The magneto-optical effect lifts the frequency degeneracy between clockwise and counterclockwise modes of the ring resonator 403, and the laser light is generated only in a single direction, which is clockwise or counterclockwise. Therefore, spatial hole-burning is eliminated, and the laser light is in a single longitudinal mode. An output coupler 405 and a dual-port output waveguide 406 (comprising a port I and a port II) are prepared at appropriate positions of the cross type ring resonator 403. The laser light is coupled to the output waveguide 406 by the output coupler 405. By controlling the orientation of the permanent magnet 409, the laser light is only generated in a clockwise or counterclockwise mode in the cross type ring resonator 403. If the laser light is only generated in the clockwise mode in the cross type ring resonator 103, the laser light is coupled to the port I of the output waveguide 406, and if the laser light is only generated in the counterclockwise mode in the cross type ring resonator 403, the laser light is coupled to the port II of the output waveguide 406. After coupled to the output waveguide 406, the laser light may be either used directly on the chip or output for off-chip applications by tapered fiber/lens end face coupling, tapered fiber evanescent-field coupling or grating coupling, or may be connected to an optical fiber amplifier or directly integrated with an on-chip optical waveguide amplifier for further optical amplification. If the cross coupling coefficient of the cross coupler 402 to laser light is properly reduced, the cross coupler 402 may also serve as a laser output coupler.

In a specific case C of the embodiment of FIG. 4, the solid gain media substrate 407 is a Nd-doped YAG wafer, the input waveguide 401, the cross coupler 402, the cross type ring resonator 403, the anti-reflection structure 404, the output coupler 405 and the output waveguide 406 are all prepared from silicon nitride thin film grown on the YAG wafer, the upper cover layer 408 is a silicon dioxide layer, and the cylindrical permanent magnet 409 is provided on the surface of the upper cover layer 408 at a position aligned with the cross type ring resonator 103. In another specific case D of the embodiment of FIG. 4, the difference with the case C is that the solid gain media substrate 407 is a Ti-doped sapphire wafer, the input waveguide 401, the cross coupler 402, the cross type ring resonator 403, the anti-reflection structure 404, the output coupler 405 and the output waveguide 406 are all prepared from aluminum nitride or silicon nitride thin film grown on the Ti-doped sapphire wafer, and the upper cover layer 408 comprises a material with a magneto-optical effect.

A preparation method in the embodiment shown in FIG. 4 is the same as that in the embodiment shown in FIG. 1. The preparation method of the specific case C in the embodiment of FIG. 4 is the same as that of the specific case A in the embodiment of FIG. 1. The preparation method of the specific case D in the embodiment of FIG. 4 is the same as that of the specific case B in the embodiment of FIG. 1.

Figure 6:
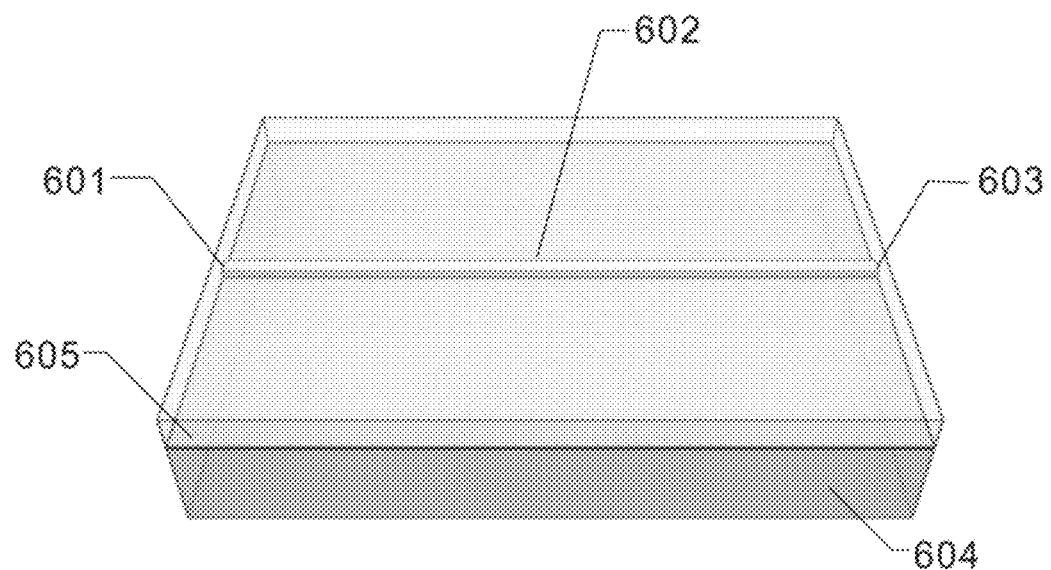
FIG. 6 is a schematic diagram of an example of a second embodiment of the disclosure (i.e., the resonator is an F—P type standing-wave resonator), where reflectors of the F—P type resonator are formed by coating end faces.

FIG. 6 shows an example of a second embodiment of the disclosure (i.e., the resonator is an F—P type standing-wave resonator), which mainly comprises an input waveguide end face 601, an F—P resonator 602, an output waveguide end face 603, a solid gain media substrate 604, and an upper cover layer 605. The input waveguide end face 601 and the output waveguide end face 603 are coated with a highly reflective coating, where the reflectivity of the output waveguide end face 603 is lower than that of the input waveguide end face 601. The input waveguide end face 601 and the output waveguide end face 603 serve as two reflectors of the F—P resonator 602.

Pump light is input into the F—P resonator 602 through the input waveguide end face 601. Since the optical field distribution of pump light overlaps with the solid gain media substrate 604, the population inversion occurs in the overlap region. The optical field distribution of lasing mode also overlaps with the population inversion region in the solid gain media substrate 604, resulting in gain. Lasing mode is reflected back and forth between the two reflectors of the F—P resonator 602, i.e., the input waveguide end face 601 and the output waveguide end face 603, forming an F—P resonance. When the gain is greater than loss, laser light is generated and output through the output waveguide end face 603. The output laser light may be output for off-chip applications by tapered fiber/lens end face coupling, tapered fiber evanescent-field coupling or grating coupling, or may also be connected to an optical fiber amplifier for further optical amplification.

A general preparation method in the embodiment shown in FIG. 6 is as follows. A laser crystal wafer is taken as the solid gain media substrate 604, on which a waveguide is made of a dielectric material with a refractive index higher than that of the substrate, an upper cover layer 605 made of a dielectric material with a lower refractive index is grown on the waveguide, and the two end faces of the waveguide are coated with a highly reflective coating after wafer dicing, where the reflectivity of one end face is lower than that of the other end face. In a specific case E, a Nd-doped YAG wafer is taken as the solid gain media substrate 604, on which a layer of silicon nitride thin film is grown via LPCVD or ICPCVD and etched via ultraviolet lithography and ICP dry etching technology to form a silicon nitride waveguide, and an upper cover layer 605 made of silicon dioxide is grown via PECVD, and the two end faces of the waveguide are coated with a highly reflective coating after wafer dicing, where the reflectivity of one end face is lower than that of the other end face. In another specific case F, the difference with the case E is that the solid gain media substrate 604 is a Ti-doped sapphire wafer, and the waveguide is made of an aluminum nitride or silicon nitride thin film grown on the Ti-doped sapphire wafer.

Figure 7:
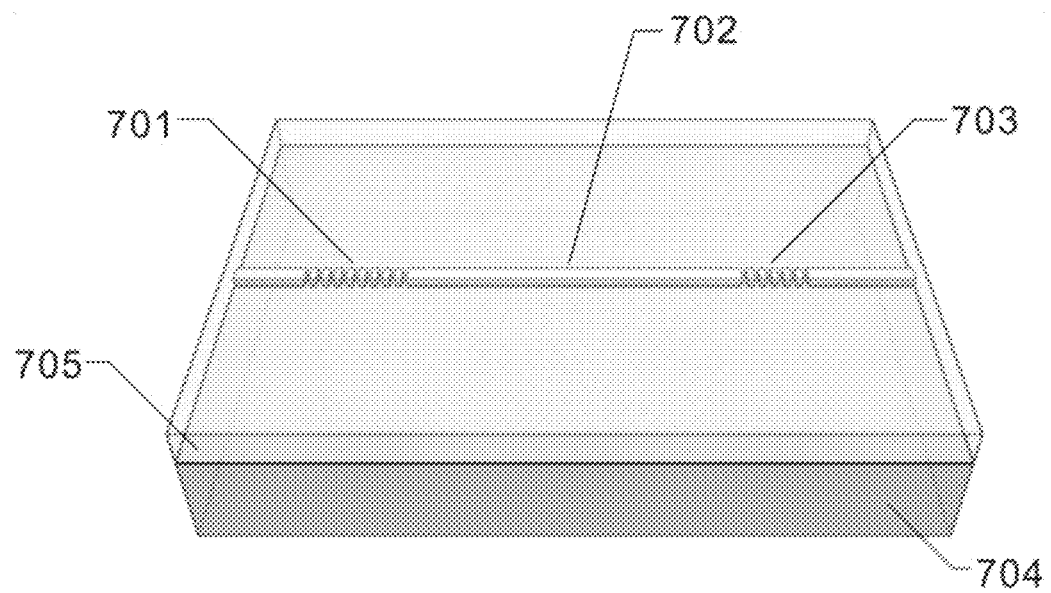
FIG. 7 is a schematic diagram of another example of the second embodiment of the disclosure (i.e., the resonator is an F—P type standing-wave resonator), where reflectors of the F—P resonator are Bragg gratings.

FIG. 7 shows another example of the second embodiment of the disclosure (i.e., the resonator is an F—P type standing-wave resonator), which mainly comprises an input grating 701, an F—P resonator 702, an output grating 703, a solid gain media substrate 704, and an upper cover layer 705. The reflectivity of the output grating 703 is lower than that of the input grating 701, and the input grating 701 and the output grating 703 serve as two reflectors of the F—P resonator 702.

Pump light is input into the F—P resonator 702 through the input grating 701. Since the optical field distribution of pump light overlaps with the solid gain media substrate 704, the population inversion occurs in the overlap region. The optical field distribution of lasing mode also overlaps with the population inversion region in the solid gain media substrate 704, resulting in gain. Lasing mode is reflected back and forth between the two reflectors of the F—P resonator, i.e., the input grating 701 and the output grating 703, forming an F—P resonance. When the gain is greater than loss, laser light is generated and output from the output grating 703. The output laser light may be either used directly on the chip or output for off-chip applications by tapered fiber/lens end face coupling, tapered fiber evanescent-field coupling or grating coupling, or may be connected to an optical fiber amplifier or directly integrated with an on-chip optical waveguide amplifier for further optical amplification.

A general preparation method in the embodiment shown in FIG. 7 is as follows. A laser crystal wafer is taken as the solid gain media substrate 704, on which a waveguide is made of a dielectric material with a refractive index higher than that of the substrate, and Bragg gratings are formed at both ends of the waveguide, respectively, where the reflectivity of one grating is lower than that of the other grating. Finally, an upper cover layer 706 made of a dielectric material with a lower refractive index is grown thereon. In a specific case G, a Nd-doped YAG wafer is taken as the solid gain media substrate 704, on which a layer of silicon nitride thin film is grown via LPCVD or ICPCVD and etched via ultraviolet lithography and ICP dry etching technology to form a silicon nitride waveguide, and Bragg gratings are formed at both ends of the waveguide via electron beam lithography technology, where the reflectivity of one grating is lower than that of the other grating. Finally, an upper cover layer 705 made of silicon dioxide is grown via PECVD. In another specific case H, the difference with the case G is that the solid gain media substrate 704 is a Ti-doped sapphire wafer, and the waveguide is made of an aluminum nitride or silicon nitride thin film grown on the Ti-doped sapphire wafer.

According to the optically pumped on-chip solid-state laser provided by the disclosure, the resonator, the waveguides and other on-chip optical field confinement structures in the disclosure are made of materials with high refractive index which is significantly different from that of surrounding media, so that the optical field confinement capability is greatly enhanced, the mode size and the bending radius of the waveguides are greatly reduced, and the resonator size is greatly reduced. The dramatic reduction in the mode size and the resonator size brings a significant reduction in the lasing threshold, and a significant increase in device integration and stability, among other benefits. In addition, optical structures such as resonators and waveguides in the disclosure may be prepared by, but not limited to UV lithography, electron beam lithography, focused ion beam etching and other mature micro-nano preparation technologies which are flexible and diverse, and highly adaptable.

In the description of the disclosure, it should be understood that the orientation or positional relationship indicated by the terms "longitudinal", "transverse", "upper", "lower", "above", "under", "between", "front", "rear", "left", "right", "vertical", "horizontal", "top", "bottom", "inner" and "outer" is based on the orientation or positional relationship shown in the attached drawings for the convenience of describing the disclosure, rather than indicating or implying that the device or element must have a specific orientation, be constructed and operated in a specific orientation, it cannot be understood as a limitation of the disclosure.

It will be obvious to those skilled in the art that changes and modifications may be made, and therefore, the aim in the appended claims is to cover all such changes and modifications.

What is claimed is:

1. An optically pumped on-chip solid-state laser, comprising:
   a solid gain media substrate; and
   a laser generating structure disposed above the solid gain media substrate; wherein:
   the laser generating structure comprises a resonator, a pump light input structure, and a laser light output structure;
   the resonator is disposed between the pump light input structure and the laser light output structure, and is propped against or is in clearance fit with the solid gain media substrate; and
   the resonator is a dielectric resonator comprising a dielectric material different from a material of the solid gain media substrate, and the dielectric material has a refractive index higher than that of the solid gain media substrate; the resonator has a mode field that overlaps with the solid gain media substrate; pump light is input by the pump light input structure into the resonator from outside, and the pump light in the resonator has a first optical field distribution that overlaps with the solid gain media substrate to form an overlap region, so that the solid gain media substrate is excited in the overlap region to form a population inversion region; and a lasing mode in the resonator has a second optical field distribution that overlaps with the population inversion region in the solid gain media substrate, resulting in gain, and when the gain is greater than loss, laser light is generated and output by the laser light output structure.

2. The laser of claim 1, wherein the resonator is a traveling-wave ring resonator or a whispering gallery resonator.

3. The laser of claim 2, wherein the laser light generated in the resonator is coupled from the resonator to a waveguide through a coupler by evanescent-field coupling.

4. The laser of claim 2, wherein the pump light is coupled from a waveguide into the resonator through a coupler by evanescent-field coupling.

5. The laser of claim 2, wherein the laser light generated in the resonator is coupled from the resonator to a waveguide through a coupler by evanescent-field coupling, and the pump light is coupled from a waveguide into the resonator through the same coupler.

6. The laser of claim 2, wherein the traveling-wave ring resonator is a cross type traveling-wave ring resonator provided with a cross coupler comprising waveguides.

7. The laser of claim 6, wherein the laser light generated in the resonator is output from one of the waveguides of the cross coupler.

8. The laser of claim 6, wherein the pump light is input into the resonator from one of the waveguides of the cross coupler.

9. The laser of claim 6, wherein the pump light is input into the resonator from one of the waveguides of the cross coupler, and the laser light generated in the resonator is output from the same waveguide.

10. The laser of claim 2, wherein the solid gain media substrate comprises a material with a magneto-optical effect, and the magneto-optical effect is generated by an applied magnetic field, so that frequency degeneracy between clockwise and counterclockwise modes of the resonator is lifted, and the laser light is generated only in a single direction, which is clockwise or counterclockwise.

11. The laser of claim 2, wherein a material with a magneto-optical effect is provided near the resonator, and the magneto-optical effect is generated by an applied magnetic field, so that frequency degeneracy between clockwise and counterclockwise modes of the resonator is lifted, and the laser light is generated only in a single direction, which is clockwise or counterclockwise.

12. The laser of claim 11, wherein a permanent magnet, by which the magnetic field is generated, is disposed above the resonator.

13. The laser of claim 12, wherein the mode of the traveling-wave ring resonator is a quasi-transverse magnetic mode, and the permanent magnet, with a diameter difference of 0 to 10% from the traveling-wave ring resonator, is a cylindrical permanent magnet axially magnetized, and disposed above and coaxial with the traveling-wave ring resonator; and the permanent magnet generates a static magnetic field whose principal component at the mode field of the traveling-wave ring resonator is a radial component.

14. The laser of claim 11, wherein the laser light is generated only in a single direction in the resonator, which is clockwise or counterclockwise, thus eliminating spatial hole-burning, and the laser light is in a single longitudinal mode.

15. The laser of claim 11, wherein the laser light generated in the resonator is coupled from the resonator to a waveguide by evanescent-field coupling and output in a single direction.

16. The laser of claim 1, wherein the pump light input structure and the laser light output structure comprise on-chip planar optical waveguides or optical fibers.

17. The laser of claim 2, wherein the resonator is an F—P type standing-wave resonator.

18. The laser of claim 17, wherein reflectors of the F—P type standing-wave resonator are formed by coating end faces of waveguide or by Bragg gratings.

19. The laser of claim 18, wherein the pump light is input through one of the reflectors.

20. The laser of claim 18, wherein the laser light is output through one of the reflectors.

21. The laser of claim 1, wherein the resonator is covered by an upper cover layer with a refractive index lower than that of the dielectric material of the resonator.

22. The laser of claim 1, wherein the solid gain media substrate is a solid laser crystal wafer doped with luminescent ions, and the solid laser crystal wafer is yttrium aluminum garnet (YAG) wafer, sapphire wafer, or lithium niobate wafer.

* * * * *